US012786477B2

(12) United States Patent
Wang

(10) Patent No.: US 12,786,477 B2
(45) Date of Patent: Nov. 3, 2026

(54) ENHANCED SIGNALING OF SEI PROCESSING ORDER IN VIDEO BITSTREAMS

(71) Applicant: Bytedance Inc., Los Angeles, CA (US)

(72) Inventor: Ye-kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 19/038,081

(22) Filed: Jan. 27, 2025

(65) Prior Publication Data

US 2025/0175652 A1 May 29, 2025

Related U.S. Application Data

(63) Continuation of application No. PCT/US2023/028870, filed on Jul. 27, 2023.

(60) Provisional application No. 63/392,779, filed on Jul. 27, 2022.

(51) Int. Cl.
*H04N 19/70* (2014.01)

(52) U.S. Cl.
CPC .................................... *H04N 19/70* (2014.11)

(58) Field of Classification Search
CPC ...................................................... H04N 19/70
See application file for complete search history.

(56) References Cited

U.S. PATENT DOCUMENTS 11,962,765 B1 * 4/2024 Sánchez De La Fuente ............... H04N 19/70
12,542,929 B2 * 2/2026 Yin ........................ H04N 19/70
2015/0271498 A1 9/2015 Wang et al.
2019/0116366 A1 4/2019 Andrivon
2022/0217389 A1 7/2022 Sychev
2023/0099238 A1 3/2023 Wang
2024/0015332 A1 * 1/2024 He ......................... H04N 19/70

FOREIGN PATENT DOCUMENTS

CN 107409229 A 11/2017
CN 114402623 A 4/2022
WO 2021208896 A1 10/2021
WO 2022206988 A1 10/2022
WO 2023278302 A1 1/2023

OTHER PUBLICATIONS

Series H: Audiovisual and multimedia systems Infrastructure of audiovisual services - Coding of moving video High efficiency video coding, ITU-T and ISO/IEC, Rec. Itu-T H.265 | ISO/IEC 23008-2 (in force edition), 728 pages.

(Continued)

*Primary Examiner* — Jae N Noh
(74) *Attorney, Agent, or Firm* — Conley Rose, P.C.

(57) ABSTRACT

A mechanism for processing video data is disclosed. A conversion is performed between a visual media data and a bitstream based on a rule that includes a bitstream conformance requirement which requires that a supplemental enhancement information (SEI) processing order SEI message shall contain a SEI payload type syntax element with at least a first entry and a second entry.

20 Claims, 5 Drawing Sheets

(56) References Cited

OTHER PUBLICATIONS

Document: JVET-G1001-v1, Chen, J., et al., "Algorithm description of Joint Exploration Test Model 7 (JEM7)," Joint Video Exploration Team (JVET) of Itu-T Sg 16 WP 3 and Iso/Iec Jtc 1/SC 29/WG 11 7th Meeting: Torino, IT, Jul. 13- 21, 2017, 50 pages.
"Series H: Audiovisual and multimedia systems Infrastructure of audiovisual services - Coding of moving video Versatile video coding," Rec. Itu-T H.266 | ISO/IEC 23090-3, Sep. 2023, 538 pages.
"Series H: Audiovisual and multimedia systems Infrastructure of audiovisual services - Coding of moving video Versatile supplemental enhancement information messages for coded video bitstreams," Rec. ITU-T Rec. H.274 | Iso/ Iec 23002-7, Sep. 2023, 134 pages.
Document: JVET-AA0102-v1, Yin, P., et al., "AHG9: Sei processing order SEI message," Joint Video Experts Team (JVET) of Itu-T Sg 16 WP 3 and Iso/Iec Jtc 1/SC 29 27th Meeting, by teleconference, Jul. 13-22, 2022, 5 pages.
International Search Report from PCT Application No. PCT/US2023/028870 dated Oct. 19, 2023, 3 pages.
Chinese Office Action from Chinese Patent Application No. 202380057418.3 dated Dec. 23, 2025, 11 pages.
Chinese Notice of Allowability from Chinese Patent Application No. 202380057418.3 dated Jun. 1, 2026, 6 pages.

* cited by examiner

ENHANCED SIGNALING OF SEI PROCESSING ORDER IN VIDEO BITSTREAMS

CROSS-REFERENCE TO RELATED APPLICATION

This application is a continuation of International Patent Application No. PCT/US2023/028870, filed on Jul. 27, 2023, which claims the priority to and benefits of U.S. Provisional Patent Application No. 63/392,779 filed on Jul. 27, 2022. The aforementioned patent application is hereby incorporated by reference in its entirety.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: performing a conversion between a visual media data and a bitstream of the visual media data based on a rule, wherein the rule includes a bitstream conformance requirement which requires that a supplemental enhancement information (SEI) processing order SEI message shall contain a SEI payload type syntax element with at least a first entry and a second entry.

Optionally, in any of the preceding aspects, another implementation of the aspect provides that the SEI payload type syntax element is po_sei_payload_type, the first entry is po_sei_payload_type[0], and the second entry is po_sei_payload_type[1].

Optionally, in any of the preceding aspects, another implementation of the aspect provides that the bitstream conformance requirement requires that the SEI processing order SEI message shall contain a preferred order syntax element with at least a first entry and a second entry.

Optionally, in any of the preceding aspects, another implementation of the aspect provides that the preferred order syntax element is po_sei_processing_order, the first entry is po_sei_processing_order[0], and the second entry is po_sei_processing_order [1].

Optionally, in any of the preceding aspects, another implementation of the aspect provides that within the SEI processing order SEI message, each of po_sei_payload_type [0] and po_sei_payload_type[1] is paired with po_sei_processing_order[0] and po_sei_processing_order[1], respectively, wherein po_sei_processing_order[i] indicates a preferred order of processing a SEI message with payloadType equal to po_sei_payload_type[i].

A second aspect relates to a method for processing video data comprising: performing a conversion between a visual media data and a bitstream of the visual media data based on a rule, wherein the rule specifies that a zero value for a processing order supplemental enhancement information (SEI) payload type syntax element entry in an SEI processing order SEI message is treated in a similar manner to a one value.

Optionally, in any of the preceding aspects, another implementation of the aspect provides that the SEI payload type syntax element is po_sei_payload_type and the entry is po_sei_payload_type[i].

Optionally, in any of the preceding aspects, another implementation of the aspect provides that the po_sei_payload_type[i] is specified as follows: po_sei_processing_order[i] indicates a preferred order of processing any SEI message with payloadType equal to po_sei_payload_type[i]; and for any two different integer values of m and n that are greater than or equal to 0, po_sei_processing_order[m] less than po_sei_processing_order[n] indicates any SEI message with payloadType equal to po_sei_payload_type[m], when present, should be processed before any SEI message with payloadType equal to po_sei_payload_type[n], when present.

Optionally, in any of the preceding aspects, another implementation of the aspect provides that the conversion includes encoding the visual media data into the bitstream.

Optionally, in any of the preceding aspects, another implementation of the aspect provides that the conversion includes decoding the visual media data from the bitstream.

A third aspect relates to an apparatus for processing visual media data comprising: a processor; and a non-transitory memory with instructions thereon, wherein the instructions upon execution by the processor, cause the processor to perform any of the preceding aspects.

A fourth aspect relates to non-transitory computer readable medium comprising a computer program product for use by an apparatus for processing visual media data, the computer program product comprising computer executable instructions stored on the non-transitory computer readable medium such that when executed by a processor cause the apparatus for processing visual media data to perform the method of any of the preceding aspects.

A fifth aspect relates to a non-transitory computer-readable recording medium storing a bitstream of a visual media data which is generated by a method performed by an apparatus for processing visual media data, wherein the method comprises: generating the bitstream of the visual media data based on a rule, wherein the rule includes a bitstream conformance requirement which requires that a supplemental enhancement information (SEI) processing order SEI message shall contain a SEI payload type syntax element with at least a first entry and a second entry A sixth aspect relates to a method for storing bitstream of a visual media data comprising: generating a bitstream of the visual media data based on a rule; and storing the bitstream in a non-transitory computer-readable recording medium, wherein the rule includes a bitstream conformance requirement which requires that a supplemental enhancement information (SEI) processing order SEI message shall contain a SEI payload type syntax element with at least a first entry and a second entry.

A seventh aspect relates to a method, apparatus or system described in the present disclosure.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
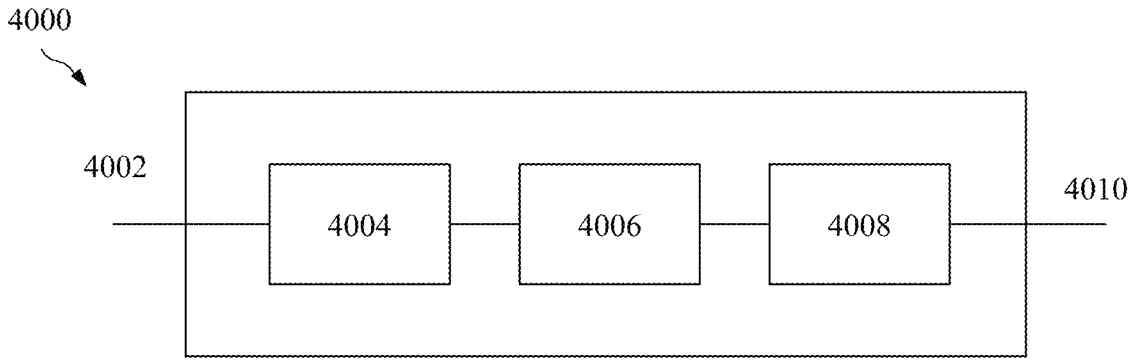
FIG. 1 is a block diagram showing an example video processing system.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present disclosure, editing changes are shown to text by "/* *\" indicating cancelled text and "{{ }}" indicating added text, with respect to a draft of the Versatile Video Coding (VVC) specification or International Organization for Standardization (ISO) based media file format (ISOBMFF) file format specification.

1. Initial Discussion

This disclosure is related to image and/or video coding technologies. Specifically, this disclosure is related to signaling of a supplemental enhancement information (SEI) processing order. The examples may be applied individually or in various combinations, for video bitstreams coded by any codec, such as the VVC standard and/or the versatile SEI messages for coded video bitstreams (VSEI) standard.

2. Abbreviations

Adaptation Parameter Set (APS), Access Unit (AU), Coded Layer Video Sequence (CLVS), Coded Layer Video Sequence Start (CLVSS), Cyclic Redundancy Check (CRC), Coded Video Sequence (CVS), Finite Impulse Response (FIR), Intra Random Access Point (IRAP), Network Abstraction Layer (NAL), Picture Parameter Set (PPS), Picture Unit (PU), Random Access Skipped Leading (RASL), Supplemental Enhancement Information (SEI), Step-wise Temporal Sublayer Access (STSA), Video Coding Layer (VCL), versatile supplemental enhancement information as described in Rec. ITU-T H.2741 ISO/IEC 23002-7 (VSEI), Video Usability Information (VUI), versatile video coding as described in Rec. ITU-T H.2661 ISO/IEC 23090-3 (VVC).

3. Further Discussion

3.1 Video Coding Standards

Video coding standards have evolved primarily through the development of the International Telecommunication Union (ITU) telecommunication standardization sector (ITU-T) and ISO/International Electrotechnical Commission (IEC) standards. The ITU-T produced H.261 and H.263, ISO/IEC produced motion picture experts group (MPEG)-1 and MPEG-4 Visual, and the two organizations jointly produced the H.262/MPEG-2 Video and H.264/MPEG-4 Advanced Video Coding (AVC) and H.265/high efficiency video coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by video coding experts group (VCEG) and MPEG jointly. Many methods have been adopted by JVET and put into the reference software named Joint Exploration Model (JEM). The JVET was renamed to be the Joint Video Experts Team (JVET) when the Versatile Video Coding (VVC) project officially started. VVC is a coding standard, targeting a 50% bitrate reduction as compared to HEVC.

The Versatile Video Coding (VVC) standard (ITU-T H.266| ISO/IEC 23090-3) and the associated Versatile Supplemental Enhancement Information (VSEI) standard (ITU-T H.274 ISO/IEC 23002-7) is designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 3600 immersive media.

The Essential Video Coding (EVC) standard (ISO/IEC 23094-1) is another video coding standard developed by MPEG.

3.2 SEI Messages in General and in VVC

An SEI message assists in processes related to decoding, display, or other purposes. However, SEI messages are not required for constructing the luma or chroma samples by the decoding process. Conforming decoders are not required to process this information for output order conformance. Some SEI messages are required for checking bitstream conformance and for output timing decoder conformance. Other SEI messages are not required for check bitstream conformance.

Annex D of VVC specifies syntax and semantics for SEI message payloads for some SEI messages, and specifies the use of the SEI messages and VUI parameters for which the syntax and semantics are specified in ITU-T H.SEI||ISO/IEC 23002-7.

3.3 the SEI Processing Order SEI Message

JVET-AA0102 proposes a SEI message named the SEI processing order SEI message. The SEI processing order SEI message is for carrying information indicating the preferred processing order, as determined by the encoder (e.g., the content producer), for different types of SEI messages that may be present in the bitstream. One implementation of the syntax and semantics of this SEI message is as follows.

3.3.1 SEI Processing Order SEI Message Syntax

| sei_processing_order( payloadSize ) { | Descriptor |
|---|---|
| for( i = 0, b = 0; b < payloadSize; i++, b += 3 ) { | |
| po_sei_payload_type[ i ] | u(16) |
| po_sei_processing_order[ i ] | u(8) |
| } | |
| } | |

3.3.2 SEI Processing Order SEI Message Semantics

The SEI processing order SEI message carries information indicating the preferred processing order, as determined by the encoder (e.g., the content producer), for different types of SEI messages that may be present in the bitstream. When an SEI processing order SEI message is present in any access unit of a CVS, an SEI processing order SEI message shall be present in the first access unit of the CVS. The SEI processing order SEI message persists in decoding order from the current access unit until the end of the CVS. When there are multiple SEI processing order SEI messages present in a CVS, they shall have the same content.

po_sei_payload_type[i] specifies the value of payloadType for the i-th SEI message for which information is provided in the SEI processing order SEI message. The values of po_sei_payload_type[m] and po_sei_payload_type[n] shall not be identical when m is not equal to n.

po_sei_processing_order[i] indicates the preferred order of processing any SEI message with payloadType equal to po_sei_payload_type[i]. po_sei_processing_order[m] greater than 0 and less than po_sei_processing_order[n] indicates any SEI message with payloadType equal to po_sei_payload_type[in], when present, should be processed before any SEI message with payloadType equal to po_sei_payload_type[n], when present. po_sei_processing_order[i] equal to 0 specifies that the preferred order of processing SEI messages with payloadType equal to po_sei_payload_type[i] is unknown or unspecified or determined by an external mechanism not specified in this Specification.

4. Technical Problems Solved by Disclosed Embodiments

An example design for SEI processing order SEI message has the following problems. The syntax allows for signaling of only one entry of the syntax elements po_sei_processing_order [i] and po_sei_payload_type[i] in the loop. However, this approach only makes sense when two or more entries of those syntax elements are signaled, because only in that case can a relative processing order among multiple types of SEI messages be signaled.

In the semantics of the SEI processing order SEI message, the value 0 for po_sei_processing_order[i] is specified as a special treatment. po_sei_processing_order[i] equal to 0 specifies that the preferred order of processing SEI messages with payloadType equal to po_sei_payload_type[i] is unknown or unspecified or determined by external mechanisms. However, the special treatment of the value 0 for po_sei_payload_type[i] is neither necessary nor useful, but would rather introduce a lack of clarity and even operational problems. For example, if the preferred processing order is unknown or unspecified, then clearer approach would not list that payload type value in the SEI message. If the preferred processing order is determined by external mechanisms, then it is unclear how the externally-determined order should interact with those signaled in the SEI message.

5. A Listing of Solutions and Embodiments

To solve the above-described problem, methods as described below are disclosed. The examples should be considered as examples to explain the general concepts and should not be interpreted in a narrow way. Furthermore, these examples can be applied individually or combined in any manner.

Example 1

In one example, to solve the first problem, it is required that an SEI processing order SEI message shall contain at least two entries of the syntax elements po_sei_processing_order [i] and po_sei_payload_type[i], for i equal to 0 and 1, respectively.

Example 2

In one example, the following constraint is specified. It is a requirement of bitstream conformance that an SEI processing order SEI message shall contain at least two entries of the syntax elements po_sei_processing_order [i] and po_sei_payload_type[i], for i equal to 0 and 1, respectively.

Example 3

In another example, the following constraint is specified. It is a requirement of bitstream conformance that, within an SEI processing order SEI message, there shall be at least two entries of the syntax elements po_sei_processing_order [i] and po_sei_payload_type[i], e.g., the syntax elements po_sei_processing_order [0], po_sei_payload_type[0], p po_sei_processing_order [1], and po_sei_payload_type[1] shall be present.

Example 4

To solve the second problem, the value 0 for po_sei_processing_order[i] is treated the same as other values of the syntax element.

Example 5

In one example, the semantics of po_sei_processing_order[i] is specified as follows. po_sei_processing_order [i] indicates the preferred order of processing any SEI message with payloadType equal to po_sei_payload_type[i]. For any two different integer values of m and n that are greater than or equal to 0, po_sei_processing_order[m] less than po_sei_processing_order[n] indicates any SEI message with payloadType equal to po_sei_payload_type[m], when present, should be processed before any SEI message with payloadType equal to po_sei_payload_type[n], when present.

6. Embodiments

Below are some example embodiments for some of the disclosure items summarized in Examples 1-5 above in section 5.

6.1 First Embodiment

Most relevant parts that have been added or modified are shown in "{{ }}", and some of the deleted parts are shown in "/* *\". There may be some other changes that are editorial in nature and thus not highlighted.

6.1.1 SEI Processing Order SEI Message Syntax

| sei_processing_order( payloadSize ) { | Descriptor |
|---|---|
| for( i = 0, b = 0; b < payloadSize; i++, b += 3 ) { | |
| po_sei_payload_type[ i ] | u(16) |
| po_sei_processing_order[ i ] | u(8) |
| } | |
| } | |

6.1.2 SEI Processing Order SEI Message Semantics

The SEI processing order SEI message carries information indicating the preferred processing order, as determined by the encoder (e.g., the content producer), for different types of SEI messages that may be present in the bitstream. When an SEI processing order SEI message is present in any access unit of a CVS, an SEI processing order SEI message shall be present in the first access unit of the CVS. The SEI processing order SEI message persists in decoding order from the current access unit until the end of the CVS. When there are multiple SEI processing order SEI messages present in a CVS, they shall have the same content.

{{It is a requirement of bitstream conformance that, within an SEI processing order SEI message, there shall be at least two entries of the syntax elements po_sei_processing_order [i] and po_sei_payload_type[i], i.e., the syntax elements po_sei_processing_order [0], po_sei_payload_type[0], po_sei_processing_order [1], and po_sei_payload_type[1] shall be present.}} po_sei_payload_type[i] specifies the value of payloadType for the i-th SEI message for which information is provided in the SEI processing order SEI message. The values of po_sei_payload_type[m] and po_sei_payload_type[n] shall not be identical when m is not equal to n.

po_sei_processing_order[i] indicates the preferred order of processing any SEI message with payloadType equal to po_sei_payload_type[i]. {{For any two different integer values of m and n that are greater than or equal to 0,}} po_sei_processing_order[m]/*greater than 0 and*\ less than po_sei_processing_order[n] indicates any SEI message with payloadType equal to po_sei_payload_type[m], when present, should be processed before any SEI message with payloadType equal to po_sei_payload_type[n], when present. /*po_sei_processing_order[i] equal to 0 specifies that the preferred order of processing SEI messages with payloadType equal to po_sei_payload_type[i] is unknown or unspecified or determined by external means not specified in this Specification.*\

FIG. 1 is a block diagram showing an example video processing system 4000 in which various embodiments disclosed herein may be implemented. Various implementations may include some or all of the components of the system 4000. The system 4000 may include input 4002 for receiving video content. The video content may be received in a raw or uncompressed format, e.g., 8- or 10-bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 2:
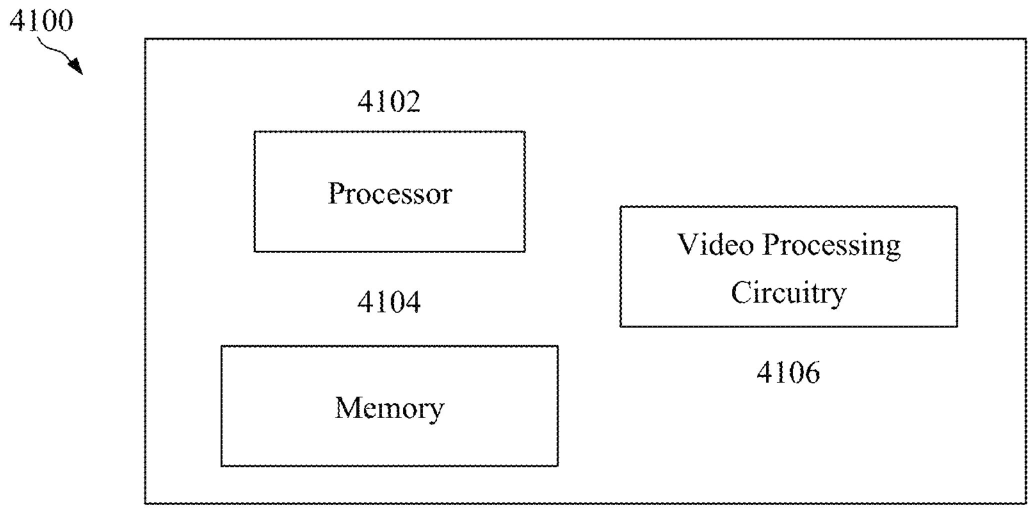
FIG. 2 is a block diagram of an example video processing apparatus.

FIG. 2 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and embodiments described herein. The video processing circuitry 4106 may be used to implement, in hardware circuitry, some embodiments described in the present disclosure. In some embodiments, the video processing circuitry 4106 may be at least partly included in the processor 4102, e.g., a graphics co-processor.

Figure 3:
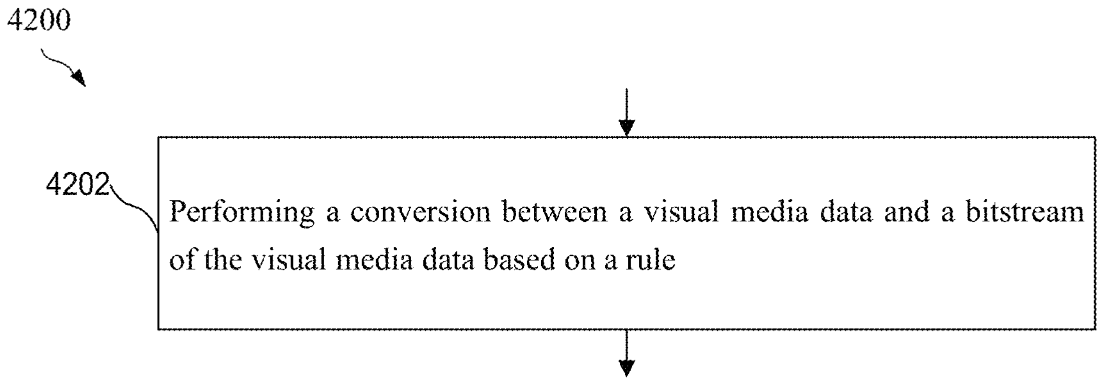
FIG. 3 is a flowchart for an example method of video processing.

FIG. 3 is a flowchart for an example method 4200 of video processing. The method 4200 includes performing a conversion between a visual media data and a bitstream of the visual media data based on a rule at step 4202. The rule includes a bitstream conformance requirement which requires that a supplemental enhancement information (SEI) processing order SEI message shall contain a SEI payload type syntax element with at least a first entry and a second entry. In an example, the SEI payload type syntax element in step 4202 is po_sei_payload_type, the first entry is po_sei_payload_type[0], and the second entry is po_sei_payload_type[1]. In another example, the bitstream conformance requirement in step 4202 requires that the SEI processing order SEI message shall contain a preferred order syntax element with at least a first entry and a second entry. In yet another example, the preferred order syntax element is po_sei_processing_order, the first entry is po_sei_processing_order[0], and the second entry is po_sei_processing_order [1].

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 4:
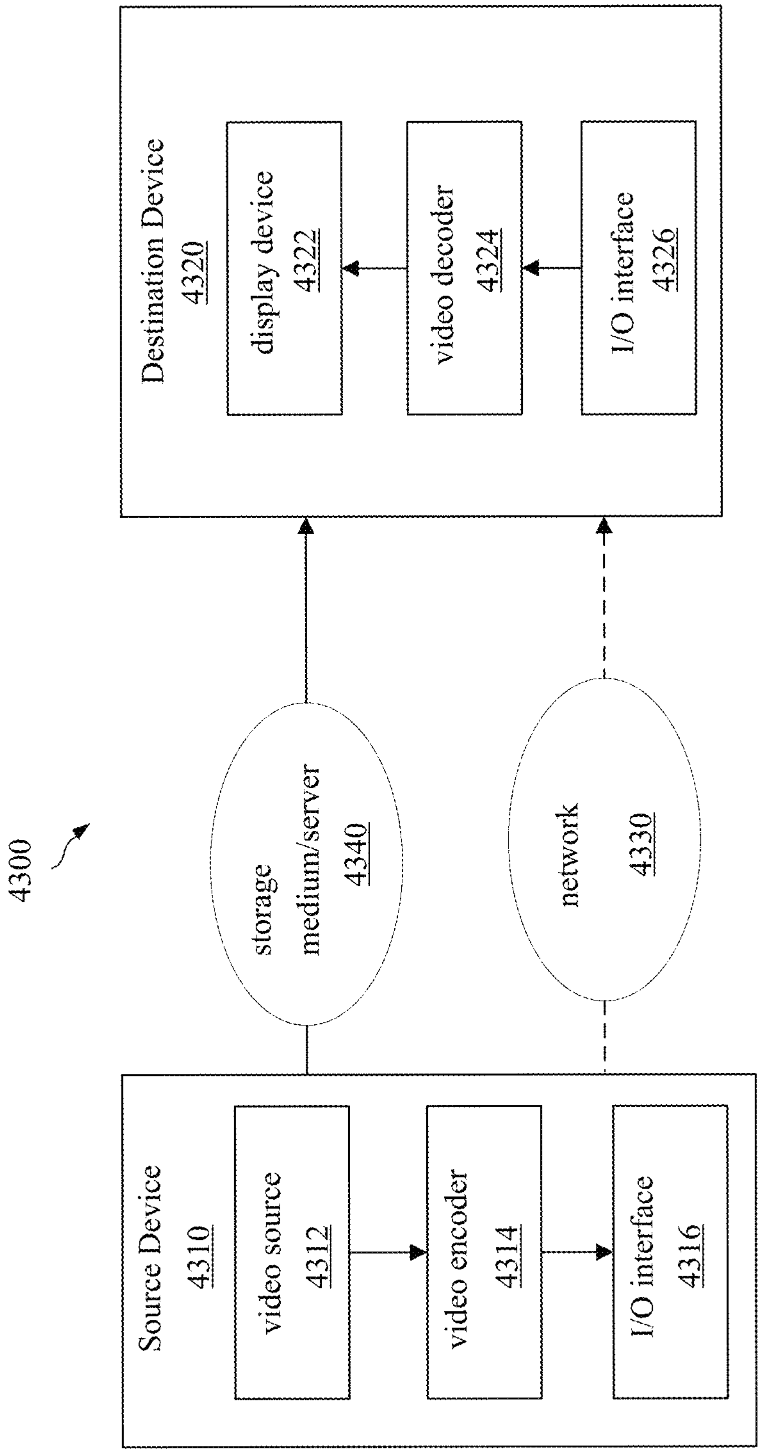
FIG. 4 is a block diagram that illustrates an example video coding system.

FIG. 4 is a block diagram that illustrates an example video coding system 4300 that may utilize the embodiments of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 5:
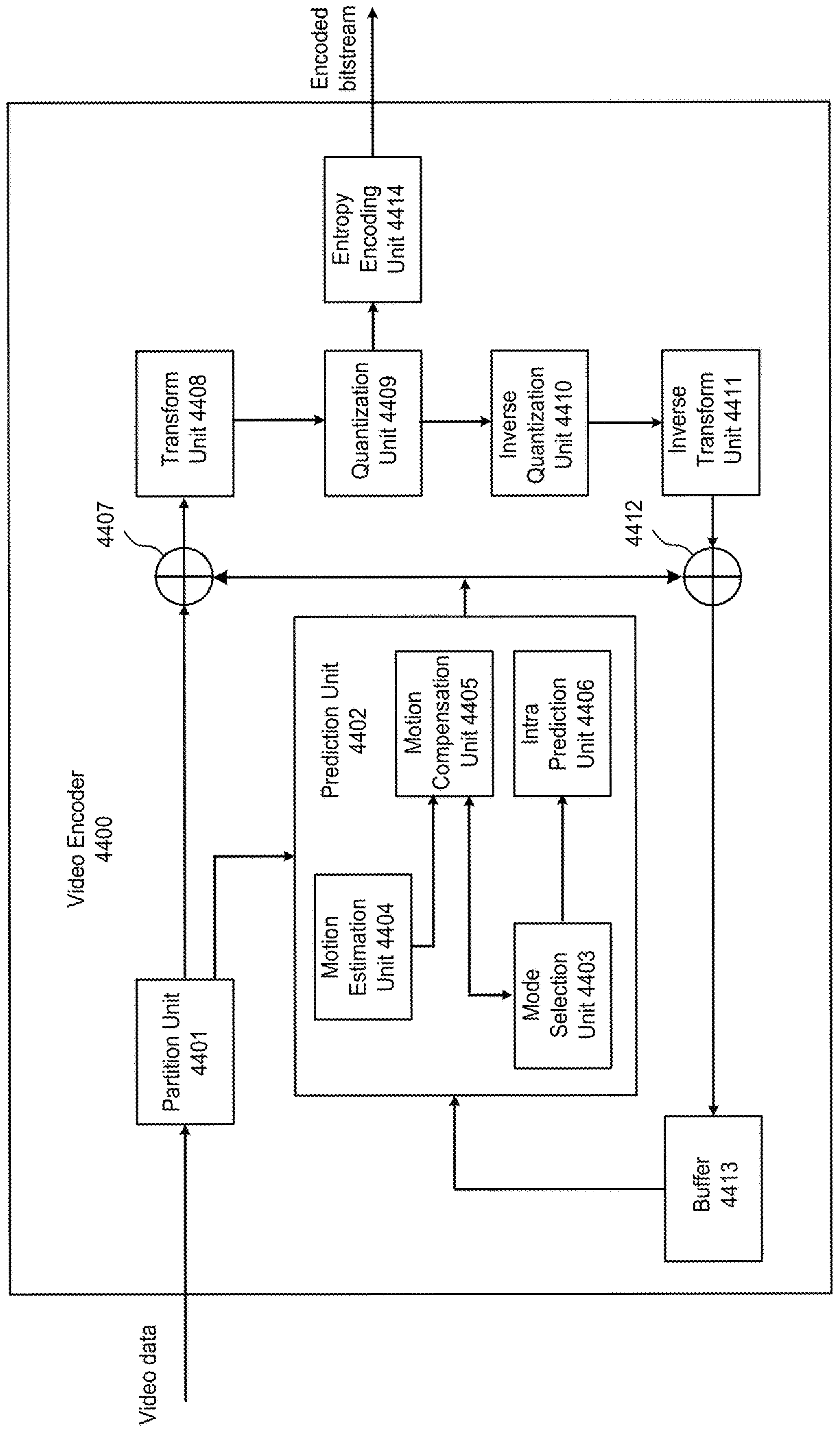
FIG. 5 is a block diagram that illustrates an example encoder.

FIG. 5 is a block diagram illustrating an example of video encoder 4400, which may be video encoder 4314 in the system 4300 illustrated in FIG. 4. Video encoder 4400 may be configured to perform any or all of the embodiments of this disclosure. The video encoder 4400 includes a plurality of functional components. The embodiments described in this disclosure may be shared among the various components of video encoder 4400. In some examples, a processor may be configured to perform any or all of the embodiments described in this disclosure.

The functional components of video encoder 4400 may include a partition unit 4401; a prediction unit 4402, which may include a mode select unit 4403, a motion estimation unit 4404, a motion compensation unit 4405, and an intra prediction unit 4406; a residual generation unit 4407; a transform processing unit 4408; a quantization unit 4409; an inverse quantization unit 4410; an inverse transform unit 4411; a reconstruction unit 4412; a buffer 4413; and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 6:
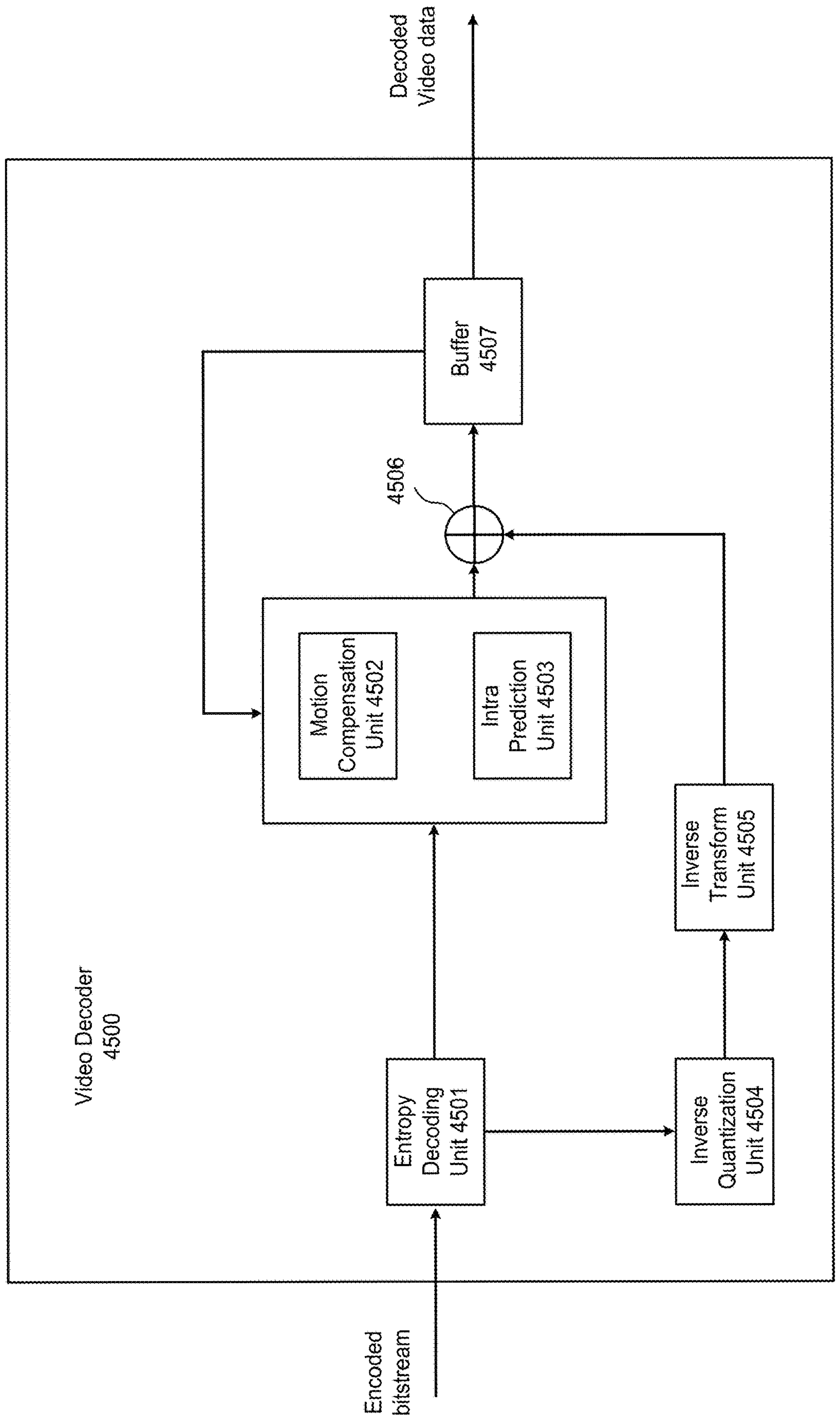
FIG. 6 is a block diagram that illustrates an example decoder.

FIG. 6 is a block diagram illustrating an example of video decoder 4500 which may be video decoder 4324 in the system 4300 illustrated in FIG. 4. The video decoder 4500 may be configured to perform any or all of the embodiments of this disclosure. In the example shown, the video decoder 4500 includes a plurality of functional components. The embodiments described in this disclosure may be shared among the various components of the video decoder 4500. In some examples, a processor may be configured to perform any or all of the embodiments described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 7:
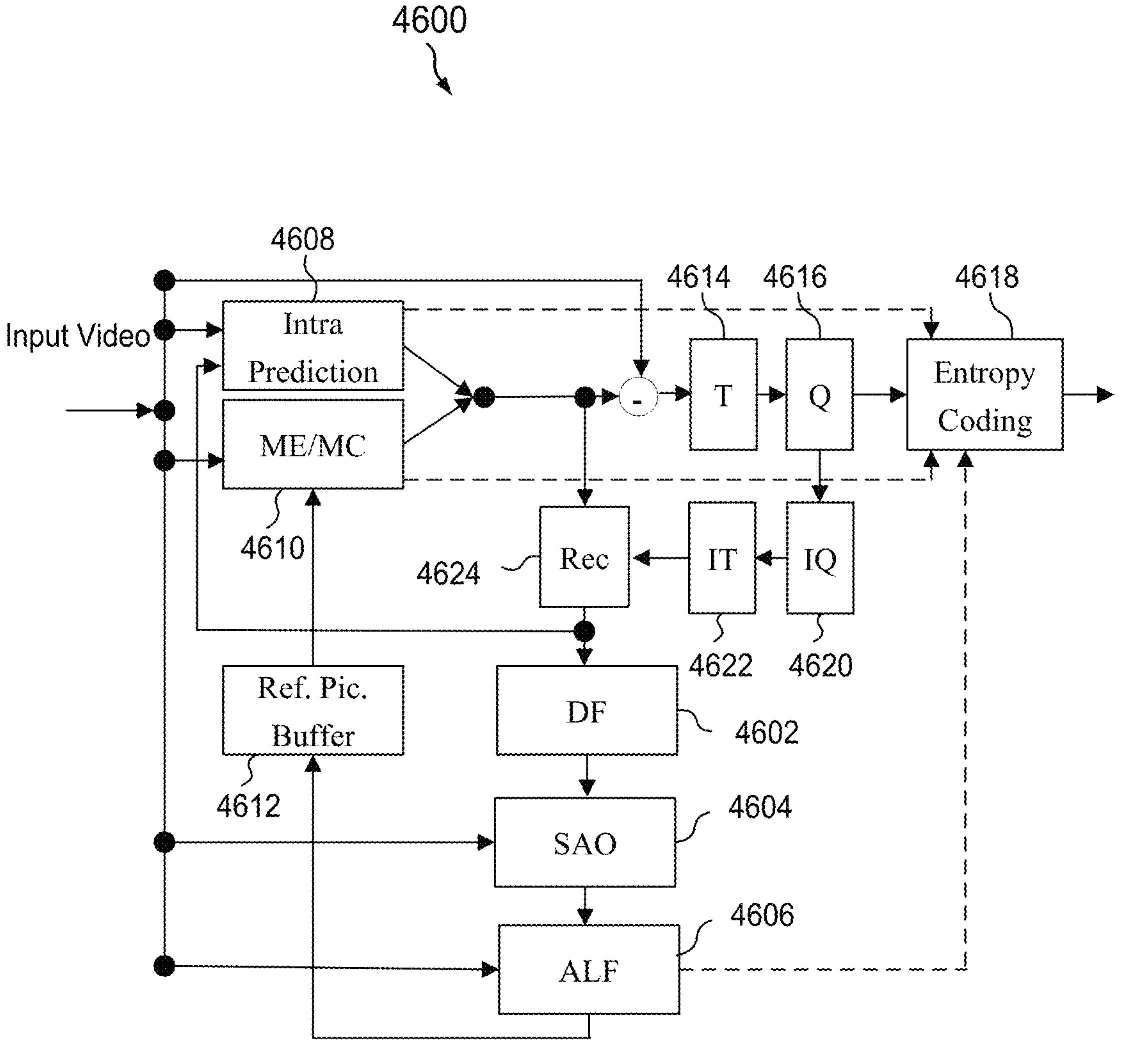
FIG. 7 is a schematic diagram of an example encoder.

FIG. 7 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of embodiments discussed herein.

The following solutions show examples of embodiments discussed in the previous section (e.g., item 1).

1. A method for processing media data comprising: performing a conversion between a visual media data and a bitstream of the visual media data based on a rule, wherein the rule includes a bitstream conformance requirement which requires that a supplemental enhancement information (SEI) processing order SEI message shall contain a SEI payload type syntax element with at least a first entry and a second entry.

2. The method of claim 1, wherein the SEI payload type syntax element is po_sei_payload_type, the first entry is po_sei_payload_type[0], and the second entry is po_sei_payload_type[1].

3. The method of any of claims 1-2, wherein the bitstream conformance requirement requires that the SEI processing order SEI message shall contain a preferred order syntax element with at least a first entry and a second entry.

4. The method of claim 3, wherein the preferred order syntax element is po_sei_processing_order, the first entry is po_sei_processing_order[0], and the second entry is po_sei_processing_order [1].

5. The method of any of claims 1-4, wherein within the SEI processing order SEI message, each of po_sei_payload_type[0] and po_sei_payload_type[1] is paired with po_sei_processing_order[0] and po_sei_processing_order [1], respectively, wherein po_sei_processing_order[i] indicates a preferred order of processing a SEI message with payloadType equal to po_sei_payload_type[i].

6. A method for processing video data comprising: performing a conversion between a visual media data and a bitstream of the visual media data based on a rule, wherein the rule specifies that a zero value for a processing order supplemental enhancement information (SEI) payload type syntax element entry in an SEI processing order SEI message is treated in a similar manner to a one value.

7. The method of claim 6, wherein the SEI payload type syntax element is po_sei_payload_type and the entry is po_sei_payload_type[i].

8. The method of any of claims 1-7, wherein the po_sei_payload_type[i] is specified as follows: po_sei_processing_order[i] indicates a preferred order of processing any SEI message with payloadType equal to po_sei_payload_type[i]; and for any two different integer values of m and n that are greater than or equal to 0, po_sei_processing_order[m] less than po_sei_processing_order[n] indicates any SEI message with payloadType equal to po_sei_payload_type[m], when present, should be processed before any SEI message with payloadType equal to po_sei_payload_type[n], when present.

9. The method of any of claims 1-8, wherein the conversion includes encoding the visual media data into the bitstream.

10. The method of any of claims 1-8, wherein the conversion includes decoding the visual media data from the bitstream.

11. An apparatus for processing visual media data comprising: a processor; and a non-transitory memory with instructions thereon, wherein the instructions upon execution by the processor, cause the processor to perform the method of any of claims 1-10.

12. A non-transitory computer readable medium comprising a computer program product for use by an apparatus for processing visual media data, the computer program product comprising computer executable instructions stored on the non-transitory computer readable medium such that when executed by a processor cause the apparatus for processing visual media data to perform the method of any of claims 1-10.

13. A non-transitory computer-readable recording medium storing a bitstream of a visual media data which is generated by a method performed by an apparatus for processing visual media data, wherein the method comprises: generating the bitstream of the visual media data based on a rule, wherein the rule includes a bitstream conformance requirement which requires that a supplemental enhancement information (SEI) processing order SEI message shall contain a SEI payload type syntax element with at least a first entry and a second entry.

14. A method for storing bitstream of a visual media data, comprising: generating a bitstream of the visual media data based on a rule; and storing the bitstream in a non-transitory computer-readable recording medium, wherein the rule includes a bitstream conformance requirement which requires that a supplemental enhancement information (SEI) processing order SEI message shall contain a SEI payload type syntax element with at least a first entry and a second entry.

15. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term “coupled” and its variants include both directly coupled and indirectly coupled. The use of the term “about” means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing visual media data, comprising:

performing a conversion between visual media data and a bitstream of the visual media data based on a rule, wherein the rule includes a requirement of bitstream conformance, and the requirement of bitstream conformance requires that within a supplemental enhancement information (SEI) processing order SEI message, there shall be at least two pairs of syntax elements, wherein one pair of syntax elements included in the at least two pairs of syntax elements comprises an SEI payload type syntax element and an SEI processing order syntax element with a first index, and another pair of syntax elements included in the at least two pairs of syntax elements comprises the SEI payload type syntax element and an SEI processing order syntax element with a second index, and wherein the rule specifies that a first syntax element specifying a number of types of SEI message for which information is provided in the SEI processing order SEI message is excluded from the SEI processing order SEI message.

2. The method of claim 1, wherein the requirement of bitstream conformance further requires that within the SEI processing order SEI message, there shall be at least two values of the SEI processing order syntax elements in the at least two pairs of syntax elements that are not equal.

3. The method of claim 1, wherein the SEI payload type syntax element is denoted as po_sei_payload_type [i], wherein an index i is a non-negative integer, and po_sei_payload_type [i] specifies a payload type value of an i-th SEI message type for which preferred processing order information is provided in the SEI processing order SEI message.

4. The method of claim 3, wherein the SEI processing order syntax element is denoted as po_sei_processing_order [j], wherein an index j is a non-negative integer, and po_sei_processing_order [j] specifies a preferred order of processing of a j-th SEI message type for which preferred processing order information is provided in the SEI processing order SEI message.

5. The method of claim 4, wherein for any two different integer values of m and n that are greater than or equal to 0, po_sei_processing_order [m] less than po_sei_processing_order[n] indicates any SEI message with payload type equal to po_sei_payload_type[m] should be processed before any SEI message with payload type equal to po_sei_payload_type[n].

6. The method of claim 4, wherein for any two different integer values of P and Q, values of po_sei_payload_type[P] and po_sei_payload_type[Q] shall not be identical when a condition is satisfied.

7. The method of claim 1, wherein the rule specifies that when the SEI processing order SEI message is present in any access unit of a coded video sequence (CVS) in the bitstream, the SEI processing order SEI message shall be present in a first access unit of the CVS.

8. The method of claim 1, wherein the rule specifies that the SEI processing order SEI message persists in decoding order from a current access unit until an end of a coded video sequence (CVS) including the current access unit.

9. The method of claim 1, wherein the rule specifies that when there are multiple SEI processing order SEI messages present in a coded video sequence (CVS), the multiple SEI processing order SEI messages shall have same content.

10. The method of claim 1, wherein the conversion includes encoding the visual media data into the bitstream.

11. The method of claim 1, wherein the conversion includes decoding the visual media data from the bitstream.

12. An apparatus for processing media data comprising: a processor; and a non-transitory memory with instructions thereon, wherein the instructions upon execution by the processor, cause the processor to:

perform a conversion between visual media data and a bitstream of the visual media data based on a rule, wherein the rule includes a requirement of bitstream conformance, and the requirement of bitstream conformance requires that within a supplemental enhancement information (SEI) processing order SEI message, there shall be at least two pairs of syntax elements, wherein one pair of syntax elements included in the at least two pairs of syntax elements comprises an SEI payload type syntax element and an SEI processing order syntax element with a first index, and another pair of syntax elements included in the at least two pairs of syntax elements comprises the SEI payload type syntax element and an SEI processing order syntax element with a second index, and wherein the rule specifies that a first syntax element specifying a number of types of SEI message for which information is provided in the SEI processing order SEI message is excluded from the SEI processing order SEI message.

13. The apparatus of claim 12, wherein the requirement of bitstream conformance further requires that within the SEI processing order SEI message, there shall be at least two values of the SEI processing order syntax elements in the at least two pairs of syntax elements that are not equal.

14. The apparatus of claim 12, wherein the SEI payload type syntax element is denoted as po_sei_payload_type [i], wherein an index i is a non-negative integer, and po_sei_payload_type [i] specifies a payload type value of an i-th SEI message type for which preferred processing order information is provided in the SEI processing order SEI message.

15. The apparatus of claim 14, wherein the SEI processing order syntax element is denoted as po_sei_processing_order [j], wherein an index j is a non-negative integer, and po_sei_processing_order [j] specifies a preferred order of processing of a j-th SEI message type for which preferred processing order information is provided in the SEI processing order SEI message.

16. A non-transitory computer-readable storage medium storing instructions that cause a processor to:

perform a conversion between visual media data and a bitstream of the visual media data based on a rule, wherein the rule includes a requirement of bitstream conformance, and the requirement of bitstream conformance requires that within a supplemental enhancement information (SEI) processing order SEI message, there shall be at least two pairs of syntax elements, wherein one pair of syntax elements included in the at least two pairs of syntax elements comprises an SEI payload type syntax element and an SEI processing order syntax element with a first index, and another pair of syntax elements included in the at least two pairs of syntax elements comprises the SEI payload type syntax element and an SEI processing order syntax element with a second index, and wherein the rule specifies that a first syntax element specifying a number of types of SEI message for which information is provided in the SEI processing order SEI message is excluded from the SEI processing order SEI message.

17. The non-transitory computer-readable storage medium of claim 16, wherein the requirement of bitstream conformance further requires that within the SEI processing order SEI message, there shall be at least two values of the SEI processing order syntax elements in the at least two pairs of syntax elements that are not equal.

18. The non-transitory computer-readable storage medium of claim 16, wherein the SEI payload type syntax element is denoted as po_sei_payload_type [i], wherein an index i is a non-negative integer, and po_sei_payload_type [i] specifies a payload type value of an i-th SEI message type for which preferred processing order information is provided in the SEI processing order SEI message.

19. A method for storing a bitstream of visual media data, comprising:

generating the bitstream of the visual media data based on a rule; and storing the bitstream in a non-transitory computer-readable recording medium, wherein the rule includes a requirement of bitstream conformance, and the requirement of bitstream conformance requires that within a supplemental enhancement information (SEI) processing order SEI message, there shall be at least two pairs of syntax elements, wherein one pair of syntax elements included in the at least two pairs of syntax elements comprises an SEI payload type syntax element and an SEI processing order syntax element with a first index, and another pair of syntax elements included in the at least two pairs of syntax elements comprises the SEI payload type syntax element and an SEI processing order syntax element with a second index, and wherein the rule specifies that a first syntax element specifying a number of types of SEI message for which information is provided in the SEI processing order SEI message is excluded from the SEI processing order SEI message.

20. The method of claim 19, wherein the requirement of bitstream conformance further requires that within the SEI processing order SEI message, there shall be at least two values of the SEI processing order syntax elements in the at least two pairs of syntax elements that are not equal.

* * * * *